April 24, 1951     A. L. M. A. ROUY     2,550,382

FILTER FOR COLORIMETERS

Filed May 3, 1946

INVENTOR.
Auguste Louis Marie Antoine Rouy
BY Lyman E. Dodge
ATTORNEY

Patented Apr. 24, 1951

2,550,382

UNITED STATES PATENT OFFICE 2,550,382

FILTER FOR COLORIMETERS

Auguste Louis Marie Antoine Rouy,
New York, N. Y.

Application May 3, 1946, Serial No. 666,924

3 Claims. (Cl. 88—14)

This invention relates to photoelectric colorimetry.

A principal object of this invention is to provide a method whereby selection may be made of the best filter for use in a photoelectric colorimeter.

A further object of the invention is to provide a method whereby precise quantitative concentration determinations may be made with one filter over a wide range of concentrations.

A further object of the invention is to provide a method whereby after two values for two different concentrations of known ratio one to the other have been obtained in terms of the microammeter readings, the values of other microammeter readings intermediate thereto may be calculated precisely in terms of concentrations.

Other objects and advantages will appear as the description of the particular physical embodiment selected to carry out my method and to illustrate the invention progresses and the novel features will be particularly pointed out in the appended claims.

Figure 1:
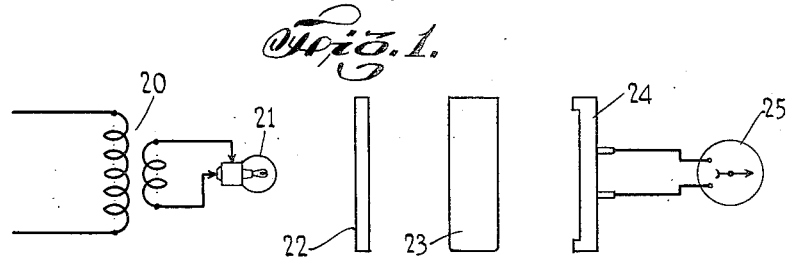
Figure 2:
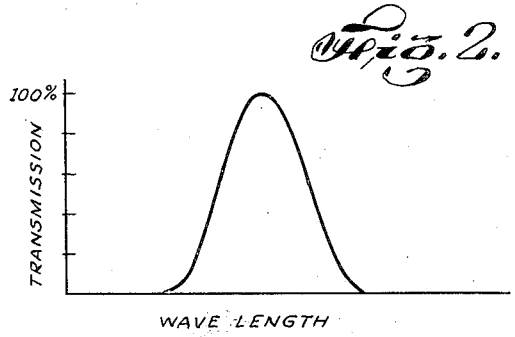
Figure 5:
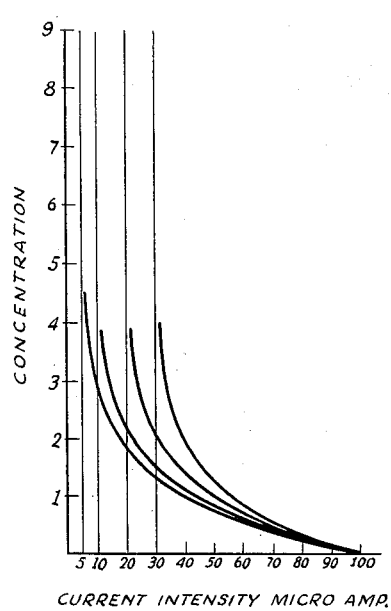
Figure 3:
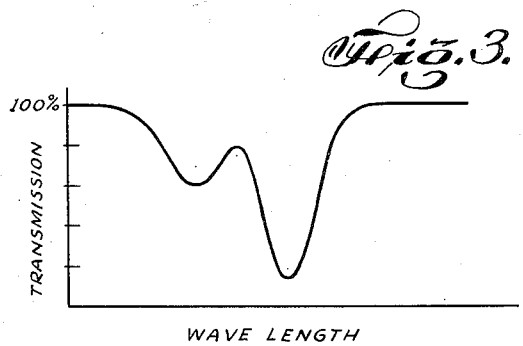
Figure 4:
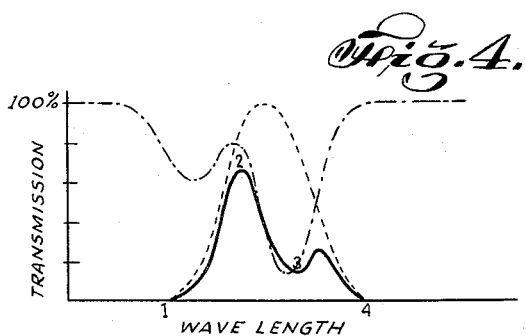

In describing the invention in detail and the particular physical embodiment selected to illustrate the invention, reference will be had to the accompanying drawings and the several views thereon, in which like characters of reference designate like parts throughout the several views, and in which:

Fig. 1 is a schematic illustration of a photoelectric colorimeter; Fig. 2 is a plot illustrating filter transmission; Fig. 3 is a plot illustrating absorption of light by a medium; Fig. 4 is a plot illustrating non-absorbable light; Fig. 5 is a plot illustrating light absorbing medium concentration with corresponding microammeter readings with variations of non-absorbable light.

A photoelectric colorimeter by which I select a proper filter could be constructed as shown diagrammatically in Fig. 1. In this figure, 20 designates a source of constant potential energizing a white light source 21. 22 designates a filter through which passes the white light from 21 to emerge as somewhat monochromatic light. 23 designates a vessel suitable for containing a colored solute dissolved in a suitable solvent. 24 designates any suitable means responsive to light impinging thereon for exhibiting electrical variation, such as a photovoltaic cell using selenium or the like, or a phototube. 25 designates any suitable apparatus, such as a microammeter which is responsive to electrical variation in the device 24.

It is to be understood that although the filter 22 has been interposed between the source and the absorbing medium, that it is sometimes placed between the absorbing medium and the means 24 responsive to light variation. The following explanation will be true for either position.

It is well known that light in passing through an absorbing medium is decreased in intensity so that the light does not have the same intensity upon emerging from the absorbing medium as it had upon entrance thereto.

It is also well known that absorption of strictly monochromatic light by an absorbing medium conforms to Lambert's equation:

$$I = I_0 e^{-kl}$$

From the above equation it is seen that the intensity of the light in passing through an absorbing medium decreases exponentially.

It is also well known that if the absorbing medium is a solution, the foregoing law still applies, but the concentration of the colored solute must also be taken into account. This condition is expressed by the equation:

$$\log_{10}\left(\frac{I_0}{I}\right) = k^c l$$

Photocolorimetric determinations are made on the basis of this last mentioned law which is known as the Lambert-Beer's law.

It has long been known that the Lambert-Beer's equation applies strictly only in case monochromatic light is used even for colored solutes which show no reaction in consequence of the light impinging thereon.

It is also well known that it is extremely difficult, if not impossible, to obtain strictly monochromatic light for use with the ordinary and usual photoelectric colorimeter. Different filters may be used which are designed to pass only light of one particular precise wave length. In fact, however, whatever filter may be used, a band of wave lengths will pass.

With a band of wave lengths, even if an extremely narrow band, the readings of the usual microammeter used with the usual photoelectric colorimeter seem to bear no known mathematical relation one to the other, so that after a filter is selected for use with a particular colored solute, it is necessary not only to calibrate the microammeter for one particular concentration, but for many concentrations, and throughout the entire scale of the ammeter. This means an immense expenditure of time because the instrument must be calibrated for each and every colored solute which is to be quantitatively determined by the instrument and for a large number of different concentrations and, in each case, throughout the entire range of the microammeter. In practice, for even a small number of substances, the necessary calibration requires at least one day's time of a skilled operator for each and every instrument produced and sold.

From a consideration of the curve showing the percentage of light of varying wave length passed by a given filter, as used in colorimetry, and a comparison of this curve with a curve showing the amount of absorption of the various wave lengths by a given solution I have observed, when these curves are superimposed, that an area is outlined exhibiting various quantities of different wave lengths which are not absorbable.

This observation of mine may be more readily appreciated by reference to the diagram, Fig. 2. This diagram, showing the filter transmission, shows the wave length, lambda, by abscissae and percent transmission by ordinate. The curve really shows the composition and intensity of light which, after passing through a filter, would be directed to the absorbing medium in a colorimeter.

Fig. 3 is a curve illustrating the amount of light absorption when the light, as shown by Fig. 2, is passed through any absorbing medium, such as a solution of a colored solute. It is readily observed that the relative absorption of the various wave lengths is highly irregular.

By reference to diagram, Fig. 4, wherein the curves of Figs. 2 and 3 have been superimposed, it will be seen that there is an area 1, 2, 3, 4, the base of which is as broad as the base of the curve of Fig. 2, which exhibits a proportion of the light incident upon the solution of colored solute which is not absorbable.

If it is true that of the light falling upon a solution of a colored solute, some is not possibly absorbable, then it is evident that Lambert's equation or Lambert's equation as modified by Beer's, is not applicable for mathematically expressing the relation between the incident light and the emerging light.

From the above consideration I propose modifying Lambert's equation, so that my equation will be as follows:

(1) $$W_a = W_0 e^{-kl} + w$$

In the above equation $W_a$ designates the light transmitted through a solution of a colored solute where the incident light is represented by $W_0$ and where $w$ represents the non-absorbable light and the other symbols have the same significance as in the Lambert-Beer's equation.

The light designated by $w$, the non-absorbable light, I designate as the "cut-off residual." This concept of cut-off residual and the mathematical modification of the Lambert-Beer's equation enables me, by making proper use thereof, to select a filter best suited for use with a particular solution of a colored solute. This proper or best filter also enables me to extend usefully the range of concentrations which may be precisely determined and further enables me, by making two readings on the usual microammeter, thereafter to calculate the microammeter readings in terms of concentrations.

In order to usefully apply my fundamental equation, it is necessary to make some transformations guided by certain known physical principles.

We know that, with low external circuit resistances, the intensity of the current produced by light energy impinging on a photoelectric cell is strictly proportional to that light energy, so that we may write:

(2) $$I = BW \text{ or } W = \frac{I}{B}$$

In the above equation I indicates current intensity and B indicates a constant of proportionality.

I may transform the Equation 1 into the following:

(3) $$\frac{I_a}{B} = \frac{I}{B} + \frac{i}{B} = \frac{I_0}{B} e^{-kl} + \frac{i}{B}$$

After clearing the above equation there results:

(4) $$I_a = I_0 e^{-kl} + i$$

As Equation 4 stands, it is not useful until a definition of $I_0$ is given. This may be done since when the concentration of the colored solute in the solutions is equal to 0 the quantity $e^{-kl} = 1$, and at the same time the current intensity reaches its maximum value, so that we may write:

(5) $$I_1 = I_0 + i$$

yielding:

(6) $$I_0 = I_1 - i$$

We may take the intensity $I_1$ as equal to the current limited by the capacity of the meter, then rewriting Equation 4 we obtain an expression for the current intensity:

(7) $$I = (I_1 - i) e^{-kl} + i$$

After re-arranging and clearing I finally obtain:

(8) $$kl = \log_e \frac{I_1 - i}{I - i} =$$

Equation 8 is a mathematical statement expressing the functioning of the apparatus, in which:

$I_1$ = maximum intensity
$I$ = intensity corresponding to the unknown concentration
$i$ = intensity corresponding to the "cut-off residual" depending on the filter
$k$ = coefficient of absorption
$l$ = lengths of light path in the solution I may further simplify Equation 8 by substituting X, the unknown, for the product $kl$ so that I will then have:

(9) $$x = \log_e \frac{I_1 - i}{I - i}$$

Having arrived at Equation 9 I may then draw curves representing the variations of the concentration X as functions of the microammeter reading I and for different given values $i$ of the "cut-off residual." These curves are shown in the diagram, Fig. 5. It will be noticed that these curves are asymptotic to the lines parallel to the Y axis designating the values of $i$. From this diagram, Fig. 5, it will be readily concluded that in order to employ the largest portion of the microammeter scale usefully, it is necessary to have the value of $i$ as small as possible so as to work as far as possible in that portion of the curves which is least nearly parallel to the $i$ line.

As the filter which best suits a given colored solute in solution is one which has the lowest $i$ value, I will now proceed to show how to ascertain this value.

In the following calculations it is best to transform Equation 7 to the form:

$$(10) \qquad I = \frac{I_1 - i}{e^x} + i$$

Equation 10 shows clearly that the only variable quantity which is a function of the concentration is:

$$\frac{I_1 - i}{e^x}$$

where the numerator $(I-i)$ is constant.

Equation 10 may be rewritten in the form:

$$(11) \qquad e^x = \frac{I_1 - i}{I - i}$$

In Equation 11 the only variables are $I$ and $x$.

In order to calculate $i$ we must, of course, proceed from experimental values. This may seem rather difficult since we must know the value of $x$ which is equal to $kl$ where $k$ is the absorptive coefficient and $l$ is the length of the light path. The difficulty fades away, however, since we may calculate this $i$ value without knowing the value of $k$ or $l$. This is accomplished by establishing two different $x$ values in the exact ratio of 1 to 2. This we may do either by preparing and making readings on two salt solutions having their concentrations in the precise ratios of 1 to 2 or by taking readings on two blanks of the same colored glass having their respective thicknesses in the ratio of 1 to 2, with the proviso that the thicknesses involved are very small. By such procedure we obtain values which may be expressed as follows:

$$(12) \qquad x_1 = K_1 l$$
$$x_2 = K_2 l$$

such that $$\frac{x_2}{x_1} = \frac{K_2 l}{K_1 l} = \frac{K_2}{K_1} = 2$$

If we write the corresponding current intensity equations we have:

$$(13) \quad (a) \qquad e^{x_2} = \frac{I_0 - i}{I_2 - i} \text{ for } k_2$$

$$\qquad (b) \qquad e^{x_1} = \frac{I_0 - i}{I_1 - i} \text{ for } k_1$$

If we now take the ratio of $a$ to $b$ the following relation appears:

$$(14) \qquad \frac{e^{x_2}}{e^{x_1}} = e^{x_1} = \frac{(I_0 - i)(I_1 - i)}{(I_2 - i)(I_2 - i)} = \frac{I_1 - i}{I_2 - i}$$

If the above expression is cleared we get:

$$(15) \qquad i = \frac{I_0 I_2 - I_1^2}{I_0 + I_2 - 2 I_1}$$

In Equation 15 the symbols designate quantities as follows:

$i$ = intensity corresponding to cut-off residual (microamperes)

$I_0$ = maximum intensity, 0 concentration (100 (microamperes)

$I_1$ = intensity corresponding to solution $b$ $I_2$ = intensity corresponding to solution $a$ If various filters are subjected to tests with two salt solutions which differ precisely in the ratio of 1 to 2 and the value of $i$ calculated, then that filter which gives the lowest value for $i$ is the best filter and the closer that value of $i$ is to 0 the better is the filter. The lower the value of $i$ the least the portion of non-absorbable light, of the light which is being passed through the solution which concentration is being determined and the closer the value of $i$ is to 0 the greater the useful range of the microammeter which gives the value of I. In practice, a value of the order of 15 should preferably not be exceeded.

Although the most convenient way to make the calculations is, perhaps, to make up two solutions having a ratio of 1 to 2, it is, of course, possible to calculate for other ratios. For any ratio expressed by an integer $n$ the general equation would be $$\frac{(I_1 - i)^n}{(I_0 - i)^{n-1}} = I_n - i$$

In this equation $I_0$ equals initial light intensity: $I_1$ is the light intensity derived from the weaker solution: $I$ is the light intensity corresponding to the higher concentration; $n$ designates the integer which expresses the ratio and $i$ is the non-absorbable light.

After having selected the best filter for the quantitative photoelectric colorimetric determination of the concentration of a colored solute in a solvent, then the proper calibration of the microammeter used therewith is to be made. This is accomplished by utilizing some of the same readings utilized for obtaining the value of $i$. If I know the reading $I_2$, as I do, in the equation for $i$, and the value of $i$, then I may write the equation for the known concentration ($C_2$) and the microammeter readings as:

$$(16) \qquad klc_2 = \log_e \frac{I_0 - i}{I_2 - i}$$

Considering $kl$ as the unknown I get:

$$(17) \qquad kl = \frac{I}{c_2} \log_e \frac{I_0 - i}{I_2 - i}$$

I now proceed to the calculation of the concentration $C_x$ corresponding to a selected microammeter reading $I_x$ by eliminating $kl$ from the Equations 16 and 17 obtaining:

$$(18) \qquad C_x = \frac{1}{\frac{1}{C_2} \log_e \frac{I_0 - i}{I_2 - i}} \log_e \frac{I_0 - i}{I_x - i}$$

I know all the values to be substituted in the right hand side of Equation 18 and for every $C_x$ I assume, I calculate value of $I_x$, so that I may calculate the entire calibration of my microammeter.

Although I have particularly described my method and a particular physical embodiment including my invention for practicing my method, nevertheless, it is to be understood that the particular means of practicing my method and the particular physical embodiment including my invention does not exhaust the possible physical embodiments of my invention.

What I claim as new and desire to secure by Letters Patent of the United States is:

1. A colorimeter of the type in which a light source causes light to impinge upon a solution and the light transmitted impinges upon a light responsive means governing an electric current indicating device wherein a light filter is interposed between the light source and the light responsive means characterized by the fact that the light filter is one for which the value of $i$ is of the order of zero to about 15 in a case where with a solution of zero concentration of solute $I_0$ is equal to 100 in the equation $$i = \frac{I_0 I_2 - I_1^2}{I_0 + I_2 - 2 I_1}$$

in which $i$ is the intensity corresponding to the non-absorbable light, $I_0$ is the maximum intensity corresponding to 0 concentration, $I_1$ is the intensity corresponding to one specific solution, $I_2$ is the intensity corresponding to a solution of double the concentration of said one solution.

2. The method of selecting a filter for use in quantitative determinations of chemical concentrations ascertained by measuring light intensities remaining after light is filtered and is passed through an absorbing medium which comprises the steps of first measuring the maximum intensity corresponding to zero concentration of the absorbing medium by passing a given light through the filter and an absorbing medium of zero concentration of the substance, the quantitative determination of which is to be made, then with the same filter interposed measuring the light intensity remaining after passing through one specific solution, and then measuring the intensity remaining after passing through a solution of precisely double the concentration of the said specific solution, and basing the selection of a filter upon a value of $i$ of the order of zero to about 15 in a case where with a solution of zero concentration of solute $I_0$ is equal to 100 in the equation $$i = \frac{I_0 I_2 - I^2_1}{I_0 + I_2 - 2I_1}$$

in which $i$ is the intensity corresponding to the non-absorbable light, $I_0$ is the maximum intensity corresponding to 0 concentration, $I_1$ is the intensity corresponding to one specific solution, $I_2$ is the intensity corresponding to a solution of double the concentration of said one solution.

3. A colorimeter of the type in which a light source causes light to impinge upon a solution and the light transmitted impinges upon a light responsive means governing an electric current indicating device wherein a light filter is interposed between the light source and the light receiving means characterized by the fact that the light filter is one for which the value of $i$ is of the order of zero to about 15 in a case where with a solution of zero concentration of solute $I_0$ is equal to 100 in the equation $$\frac{(I_1 - i)^n}{(I_0 - i)^{n-1}} = I_n - i$$

in which $i$ is the intensity corresponding to the non-absorbable light, $I_0$ is the maximum intensity corresponding to zero concentration, $I_1$ is the intensity corresponding to one specific concentration of solution, $I_n$ is the intensity corresponding to a solution of concentration $n$ times the concentration of the solution the intensity of which is represented by $I_1$ and $n$ is an integer.

AUGUSTE LOUIS MARIE ANTOINE ROUY.

REFERENCES CITED

The following references are of record in the file of this patent:

UNITED STATES PATENTS

| Number | Name | Date |
|---|---|---|
| 2,051,320 | States | Aug. 18, 1936 |
| 2,215,576 | Buckman et al. | Sept. 24, 1940 |
| 2,232,169 | Diller | Feb. 18, 1941 |
| 2,355,960 | Duffie | Aug. 15, 1944 |